(12) United States Patent
Blattner et al.

(10) Patent No.: US 10,724,617 B2
(45) Date of Patent: Jul. 28, 2020

(54) DOUBLE CLUTCH TRANSMISSION AND METHOD FOR OPERATING A DOUBLE CLUTCH TRANSMISSION

(71) Applicant: ZF Friedrichshafen AG, Friedrichshafen (DE)

(72) Inventors: Stefan Blattner, Vogt (DE); Christian Mittelberger, Ravensburg (DE); Eckhardt Lübke, Friedrichshafen (DE)

(73) Assignee: ZF FRIEDRICHSHAFN AG, Friedrichshafen (DE)

( * ) Notice: Subject to any disclaimer, the term of this patent is extended or adjusted under 35 U.S.C. 154(b) by 354 days.

(21) Appl. No.: 15/549,903

(22) PCT Filed: Jan. 11, 2016

(86) PCT No.: PCT/EP2016/050333
§ 371 (c)(1),
(2) Date: Aug. 9, 2017

(87) PCT Pub. No.: WO2016/128154
PCT Pub. Date: Aug. 18, 2016

(65) Prior Publication Data
US 2018/0031096 A1    Feb. 1, 2018

(30) Foreign Application Priority Data
Feb. 10, 2015   (DE) .................. 10 2015 202 352

(51) Int. Cl.
*F16H 37/06* (2006.01)
*F16H 3/00* (2006.01)
(Continued)

(52) U.S. Cl.
CPC .......... *F16H 37/065* (2013.01); *F16H 3/006* (2013.01); *F16H 3/097* (2013.01); *F16H 3/54* (2013.01);
(Continued)

(58) Field of Classification Search
CPC ...... F16H 37/065; F16H 37/046; F16H 3/006; F16H 3/097; F16H 2003/0818;
(Continued)

(56) References Cited

U.S. PATENT DOCUMENTS

| 7,267,022 B2 | 9/2007 | Gumpoltsberger et al. |
| 8,051,732 B2 | 11/2011 | Gitt |

(Continued)

FOREIGN PATENT DOCUMENTS

| DE | 38 12 359 A1 | 7/1989 |
| DE | 10 2004 022 414 A1 | 12/2005 |

(Continued)

OTHER PUBLICATIONS

German Search Report Corresponding to 10 2015 202 351.6 dated Nov. 20, 2015.

(Continued)

*Primary Examiner* — Huan Le
(74) *Attorney, Agent, or Firm* — Davis & Bujold PLLC; Michael J. Bujold

(57) ABSTRACT

A dual clutch transmission including two sub-transmissions, each having an input shaft arranged on an input axis, an intermediate shaft and an output shaft which is the drive output of both sub-transmissions. The intermediate shaft can be connected to the input and output shafts. The transmission also has wheel planes, shifting elements, two clutches and countershafts. A first countershaft can be connected to transmission elements of all the wheel planes on the countershaft axis and a second countershaft is connected to transmission elements of at least two wheel planes. The shifting elements include at least one single shifting element, but most of the shifting elements are double shifting elements. Two shifting elements are arranged on the input axis between two wheel planes, whose transmission ele- (Continued)

ments are connected to the second countershaft. Opposite sides of the intermediate shaft are respectively connected to a range group and the output shaft.

23 Claims, 4 Drawing Sheets

(51) Int. Cl.
*F16H 37/04* (2006.01)
*F16H 3/097* (2006.01)
*F16H 3/54* (2006.01)
*F16H 61/70* (2006.01)
*F16H 3/093* (2006.01)
*F16H 3/08* (2006.01)

(52) U.S. Cl.
CPC ............ *F16H 37/046* (2013.01); *F16H 61/70* (2013.01); *F16H 2003/0818* (2013.01); *F16H 2003/0822* (2013.01); *F16H 2003/0933* (2013.01); *F16H 2200/0078* (2013.01); *F16H 2200/0091* (2013.01); *F16H 2200/2005* (2013.01); *F16H 2200/2035* (2013.01)

(58) Field of Classification Search
CPC ..... F16H 2003/0822; F16H 2003/0933; F16H 61/70; F16H 37/06
See application file for complete search history.

(56) References Cited

U.S. PATENT DOCUMENTS

| | | | |
|---|---|---|---|
| 8,182,388 B2 | 5/2012 | Gumpoltsberger | |
| 8,485,055 B2 | 7/2013 | Gumpoltsberger et al. | |
| 9,115,789 B2 | 8/2015 | Lubke et al. | |
| 9,528,583 B2 | 12/2016 | Lübke et al. | |
| 2008/0184846 A1 | 8/2008 | Jackson | |
| 2010/0192717 A1 | 8/2010 | Gitt | |
| 2014/0171259 A1 | 6/2014 | Genise | |
| 2014/0305239 A1* | 10/2014 | Lubke | ................ F16H 37/046 74/331 |
| 2015/0292606 A1* | 10/2015 | Lubke | ................ B60K 6/48 74/661 |

FOREIGN PATENT DOCUMENTS

| | | |
|---|---|---|
| DE | 10 2004 043 387 A1 | 4/2006 |
| DE | 10 2005 028 532 A1 | 12/2006 |
| DE | 10 2005 044 068 A1 | 3/2007 |
| DE | 10 2006 028 798 A1 | 1/2008 |
| DE | 10 2006 054 281 A1 | 6/2008 |
| DE | 10 2007 040 449 A1 | 3/2009 |
| DE | 10 2008 008 001 A1 | 8/2009 |
| DE | 10 2010 004 954 A1 | 7/2011 |
| DE | 10 2011 088 396 A1 | 6/2013 |
| DE | 10 2004 064 130 B4 | 7/2013 |
| DE | 10 2012 213 701 A1 | 2/2014 |
| DE | 10 2012 213 702 A1 | 2/2014 |
| DE | 10 2012 213 708 A1 | 2/2014 |
| DE | 10 2012 213 714 A1 | 2/2014 |
| DE | 10 2012 213 716 A1 | 2/2014 |
| DE | 10 2012 213 718 A1 | 2/2014 |
| DE | 10 2012 019 071 A1 | 3/2014 |
| DE | 10 2012 220 063 A1 | 5/2014 |
| DE | 10 2013 204 452 A1 | 9/2014 |
| DE | 10 2013 204 776 A1 | 9/2014 |
| DE | 10 2013 204 777 A1 | 9/2014 |
| EP | 2 916 036 A2 | 9/2015 |
| WO | 2007/031193 A1 | 3/2007 |

OTHER PUBLICATIONS

German Search Report Corresponding to 10 2015 202 352.4 dated May 19, 2016.
German Search Report Corresponding to 10 2015 202 350.8 dated Nov. 19, 2015.
International Search Report Corresponding to PCT/EP2016/050336 dated Mar. 21, 2016.
International Search Report Corresponding to PCT/EP2016/050333 dated Apr. 4, 2016.
International Search Report Corresponding to PCT/EP2016/050334 dated Mar. 21, 2016.
Written Opinion Corresponding to PCT/EP2016/050336 dated Mar. 21, 2016.
Written Opinion Corresponding to PCT/EP2016/050333 dated Apr. 4, 2016.
Written Opinion Corresponding to PCT/EP2016/050334 dated Mar. 21, 2016.

* cited by examiner

Fig. 2

| KL1 | KL2 | A | B | C | D | E | F | G | H | I | J | K |
|---|---|---|---|---|---|---|---|---|---|---|---|---|
| V1 | ● | ● | | | | | | | | | | |
| V2 | ● | | ● | | | | | | ● | | ● | |
| V3 | ● | | | | | | | | ● | | ● | |
| V4 | ● | | | | ● | | | | | | ● | |
| V5 | ● | | | | | | ● | | | | ● | |
| V6 | ● | | ● | | | ● | ● | | | | ● | |
| V7 | ● | | | | | | ● | | | | ● | |
| V8 | ● | ● | | ● | | | | | | | ● | |
| V9 | ● | | | | | ● | | | | ● | | |
| V10 | ● | | ● | | | | | | | ● | | |
| V11 | ● | | | | ● | | | | | ● | | |
| V12 | ● | ● | | | | | | | | | | ● |
| V13 | ● | | | | | ● | ● | | | | | ● |
| V14 | ● | | | | | | ● | | | | | ● |
| V15 | ● | | | ● | | ● | ● | | | | | ● |
| V16 | ● | | ● | ● | | | | | | | | ● |
| V17 | | | | | | | | | | | | ● |
| R1 | ● | ● | | | | | | ● | | | ● | |
| R2 | ● | ● | | | | ● | | ● | | | ● | |
| R3 | ● | | ● | | | | | ● | | | ● | |

|     | KL1 | KL2 | A | B | C | D | E | F | G | H | I | J | K |
|-----|-----|-----|---|---|---|---|---|---|---|---|---|---|---|
| V1  | •   |     | • |   |   |   |   |   |   | • |   | • |   |
| V2  |     | •   |   | • |   |   | • |   |   | • |   | • |   |
| V3  | •   |     | • |   |   | • |   |   |   | • |   | • |   |
| V4  |     | •   |   | • |   |   | • |   |   |   |   | • |   |
| V5  | •   |     | • |   |   |   |   | • |   |   |   | • |   |
| V6  |     | •   |   | • |   |   | • | • |   |   |   | • |   |
| V7  | •   |     |   |   | • |   |   | • |   |   |   | • |   |
| V8  |     | •   | • |   | • |   |   |   |   |   |   | • |   |
| V9  | •   |     |   |   |   |   | • |   |   |   |   | • |   |
| V10 |     | •   |   | • |   |   |   |   |   |   | • |   |   |
| V11 | •   |     | • |   |   |   |   |   |   |   | • |   |   |
| V12 |     | •   |   |   |   | • |   |   |   |   | • |   |   |
| V13 | •   |     | • | • |   |   |   | • |   |   |   |   | • |
| V14 |     | •   |   |   |   |   | • | • |   |   |   |   | • |
| V15 | •   |     | • | • |   |   |   | • |   |   |   |   | • |
| V16 |     | •   |   |   | • |   | • |   |   |   |   |   | • |
| V17 | •   |     | • |   | • |   |   |   |   |   |   |   | • |
| V18 |     | •   |   | • |   |   | • |   |   |   |   |   | • |
| R1  | •   |     |   |   |   |   |   |   | • |   |   | • |   |
| R2  | •   |     |   |   |   |   |   |   | • |   |   | • |   |
| R3  | •   |     |   |   |   |   | • |   | • |   |   | • |   |

Fig. 3

DOUBLE CLUTCH TRANSMISSION AND METHOD FOR OPERATING A DOUBLE CLUTCH TRANSMISSION

This application is a National Stage completion of PCT/EP2016/050333 filed Jan. 11, 2016, which claims priority from German patent application serial no. 10 2015 202 352.4 filed Feb. 10, 2015.

FIELD OF THE INVENTION

The invention concerns a dual clutch transmission for use in motor vehicles. The invention also concerns a method for operating a dual clutch transmission and a motor vehicle having a dual clutch transmission.

BACKGROUND OF THE INVENTION

Transmissions for motor vehicles are designed, among others, as so-termed dual clutch transmissions in which in each case an input shaft is associated with a sub-transmission and in which the input shafts of the two sub-transmissions can be connected by a respectively associated powershift element with a drive input such as a combustion engine or an electric motor, the two powershift elements then being combined in the form of a dual clutch. The gears that can be produced by means of such a transmission are then divided in alternation between the two sub-transmissions, so that for example one sub-transmission produces the odd-numbered gears and the corresponding other sub-transmission produces the even-numbered gears. It is also known to produce the individual gear steps by means of one or more gearwheel stages or planes, each with a different gear ratio step. By virtue of corresponding shifting elements these can be connected into the force or torque flow between the drive input and the drive output, so that a corresponding desired transmission ratio is produced in each case between the drive input and the drive output.

Thanks to the alternate division of the gears between the two sub-transmissions it is possible, while driving in a gear associated with one of the sub-transmissions, already to preselect a subsequent gear in the respective other sub-transmission by appropriate actuation of the shifting devices, so that an ultimate shift to the subsequent gear is enabled by opening the powershift element of the one sub-transmission and, shortly thereafter, closing the powershift element of the other sub-transmission. In this way the gears or gear steps of the transmission can be shifted under load, which improves both the ability of the motor vehicle to accelerate and the comfort of gearshift processes for the vehicle's driver, since the gearshift takes place essentially without traction force interruption.

Such dual clutch transmissions can also be made with an intermediate countershaft arrangement in addition to the drive input and the drive output, so that a more compact structure is produced in the axial direction. Furthermore, it has also become known to provide dual clutch transmissions with a range group on the output side so as to increase the number of gears that can be obtained by means of the transmission.

From DE 10 2006 054 281 A1 a transmission for a motor vehicle in the form of a dual clutch transmission has become known. In this case the dual clutch transmission comprises two sub-transmissions, each with an input shaft. By connecting the input shafts by way of a respective powershift element, the two sub-transmissions can each be connected in alternation into a force or torque flow from a drive input to a drive output, wherein the input shaft of the first sub-transmission is in the form of a central transmission shaft and the input shaft of the second sub-transmission is in the form of a hollow transmission shaft. Furthermore an output shaft is provided which is designed as the drive output of both the sub-transmissions, so that rotational movement of the drive input can be transmitted to the drive output by way of a plurality of gear ratio steps in which the force and torque flow is led through a countershaft arrangement. During this at least two wheel planes are connected into the force and torque flow by actuating associated shifting elements, so that by a combination of the actuation of the shifting elements and the force and torque flow via corresponding wheel planes, several gear steps can be obtained. Likewise, a straight-through transmission of the rotational movement of the drive input to an output shaft of the drive output is possible by actuating appropriate shifting elements.

SUMMARY OF THE INVENTION

A purpose of the present invention is to make available a dual clutch transmission and a method for operating a dual clutch transmission, which provide as many gears as possible with as few wheel planes and as few shifting elements as possible. Moreover, a purpose of the present invention is to provide a dual clutch transmission for a motor vehicle and a method for operating a dual clutch transmission, which can be produced and operated simply and inexpensively, which has good powershifting characteristics and at the same time enables reliable transmission of torques between the drive input and the drive output. A further purpose of the present invention is to indicate an alternative dual clutch transmission for a motor vehicle and an alternative method for operating a dual clutch transmission.

The present invention achieves these objectives with a dual clutch transmission for use in motor vehicles, comprising two sub-transmissions wherein each sub-transmission comprises at least one input shaft and wherein the two input shafts are arranged on a drive input side on an input shaft axis of the transmission, an intermediate shaft and an output shaft on a drive output side of the transmission which is the drive output shaft of both the sub-transmissions, wherein the intermediate shaft is or can be connected at least indirectly to at least one of the input shafts and to the drive output shaft, at least two and in particular seven wheel planes and at least two and in particular eleven shifting elements and two clutches as well as a countershaft arrangement with a countershaft axis, in particular arranged parallel to the input shaft axis, wherein the countershaft arrangement comprises at least two countershafts such that a first one of the countershafts is and/or can be connected to transmission elements of all the wheel planes on the countershaft axis and such that a second countershaft is connected fixed to transmission elements of at least two wheel planes, and wherein at least one single shifting element is arranged and wherein most of the shifting elements are made in the form of double shifting elements, and wherein two shifting elements are arranged on the input shaft axis between the two wheel planes whose transmission elements are connected fixed to the second countershaft, and wherein a range group, in particular of planetary design, is connected on one side to the intermediate shaft and on the other side to the drive output shaft.

The present invention also achieves the objectives with a method for operating a transmission with two clutches and eleven shifting elements, in that first gear is produced by means of a closed second clutch and closed first, eighth and tenth shifting elements, and in that a second gear is produced by means of a closed first clutch and closed fifth, eighth and tenth shifting elements, and in that a third gear is produced by means of a closed second clutch and closed second, eighth and tenth shifting elements, and in that a fourth gear is produced by means of a closed first clutch and closed fourth and tenth shifting elements, and in that a fifth gear is produced by means of a closed second clutch and closed first, sixth and tenth shifting elements, and in that a sixth gear is produced by means of a closed first clutch and closed fifth, sixth and tenth shifting elements, and in that a seventh gear is produced by means of a closed second clutch and closed second, sixth and tenth shifting elements, and in that an eighth gear is produced by means of a closed first clutch and closed third and tenth shifting elements, or by means of a closed second clutch and closed first, third, sixth and tenth shifting elements, and in that a ninth gear is produced by means of a closed second clutch and closed first and ninth shifting elements, or by means of a closed first clutch and closed third and tenth shifting elements, and in that a tenth gear is produced by means of closed first clutch and closed fifth and tenth shifting elements, or by means of a closed second clutch and closed first and ninth shifting elements, and in that an eleventh gear is produced by means of a closed second clutch and closed second and ninth shifting elements, or by means of a closed first clutch and closed fifth and ninth shifting elements, and in that a twelfth gear is produced by means of a closed first clutch and closed fourth and eleventh shifting elements, or by means of a closed second clutch and closed second and ninth shifting elements, and in that a thirteenth gear is produced by means of a closed second clutch and closed first, sixth and eleventh shifting elements, or by means of a closed first clutch and closed fourth and eleventh shifting elements, and in that a fourteenth gear is produced by means of a closed first clutch and closed fifth, sixth and eleventh shifting elements, or by means of a closed second clutch and closed first, sixth and eleventh shifting elements, and in that a fifteenth gear is produced by means of a closed second clutch and closed second, sixth and eleventh shifting elements, or by means of a closed first clutch and closed fifth, sixth and eleventh shifting elements, and in that a sixteenth gear is produced by means of a closed first clutch and closed third and eleventh shifting elements, or by means of a closed second clutch and closed second, sixth and eleventh shifting elements, and in that a seventeenth gear is produced by means of a closed second clutch and closed third, fifth and eleventh shifting elements, whereas in each case all the other clutches and shifting elements are open.

Finally, the objectives are also realized in a motor vehicle, in particular a passenger car or a truck, having a dual clutch transmission as described below.

One of the advantages achieved thereby is that in this way a large number of powershiftable gears can be made available as well as powershiftable gears by way of supporting gearshifts using as few shifting elements and wheel planes as possible.

The term "wheel stage" or "wheel plane" in the description and particularly in the claims is preferably understood to mean essentially two transmission elements that co-operate to transmit torques from one transmission element to the other transmission element, such that preferably a stepped-down or stepped-up ratio is obtained in particular for transmission shafts that co-operate with the transmission elements.

The term "shifting element" in the description and particularly in the claims is preferably understood to mean a device which has at least an open and a closed condition, such that in the open condition the device does not transmit any torque and in the closed condition the device can transmit a torque between two devices that co-operate with the device or shifting element.

The term "shifting device" in the description and particularly in the claims is preferably understood to mean at least one shifting element and at least one shifting element actuating device for actuating the at least one shifting element.

The term "transmission element" in the description and particularly in the claims is preferably understood to mean a device by means of which force and/or torque can be transmitted. Here, transmission elements can preferably be in the form of wheels, preferably gearwheels and in particular spur gears, bevel gears, worm gears or the like.

The term "double shifting element" in the description and particularly in the claims is preferably understood to mean two shifting elements and two separate shifting element actuating devices, particularly in the form of sliding sleeves, which can be actuated in such manner that at least one of the two shifting elements is closed and at the same time the respective other shifting element is open.

By way of a drive input shaft, particularly preferably torque or rotational movement of a drive input, for example that of a combustion engine, can be introduced into the transmission. Preferably, between the drive input shaft and the drive output shaft there is a starting element, such as a hydrodynamic torque converter or a flow clutch.

In what follows, a shaft is understood to mean not exclusively a—for example—cylindrical machine element mounted to rotate for the transmission of torques, but rather, the term includes connecting elements in general that connect individual components or elements to one another, in particular connecting elements that connect a plurality of elements to one another in a rotationally fixed manner.

Two elements are in particular said to be connected to one another if between the elements there exists a fixed, in particular rotationally fixed connection. In particular, such connected elements rotate at the same rotational speed.

In what follows, two elements are said to be connectable if a detachable connection exists between the elements. In particular, such elements rotate at the same rotational speed when the connection is in place.

The various components and elements in the invention can be connected to one another via a shaft or a connecting element, but also directly, for example by means of a weld joint, a press fit or some other connection mode.

In the description and particularly in the claims, a clutch is understood to mean a shifting element which, depending on its actuation condition, allows a relative movement between two components or forms a connection for the transmission of a torque. A relative movement, for example, is understood to mean a rotation of two components such that the rotational speed of the first component and the rotational speed of the second component differ from one another. Moreover, one of the two components may be rotating whereas the other components is at rest or is rotating in the opposite direction.

In what follows, a non-actuated clutch is understood to be an open clutch. This means that a relative movement is possible between the two components. When the clutch is actuated or closed, the two components correspondingly rotate at the same rotational speed in the same direction.

Basically, it is also possible to use shifting elements which are closed in their non-actuated condition but open in their actuated condition. Accordingly, the association between function and shift condition is to be understood as the converse of that described above. However, in the example embodiments described with reference to the figures, the arrangement originally intended is that in which a shifting element is closed when actuated and open when not actuated.

Thanks to the use of planetary gearsets, particularly compact transmissions can be produced, so that a large degree of freedom exists as regards the arrangement of the transmission in the vehicle.

A planetary gearset comprises a sun gear, a planetary carrier or web and a ring gear. Mounted to rotate on the planetary carrier or web are planetary gearwheels or planetaries, which mesh with the teeth of the sun gear and/or the teeth of the ring gear.

The elements of a planetary gearset are understood to be, in particular, the sun gear, the ring gear, the planetary carrier or web and the planetary gearwheels or planetaries of the planetary gearset.

Particularly preferably the shifting elements can be actuated selectively, i.e. individually and according to need, whereby different gears can be produced by virtue of different gear ratios between the drive input shaft and the drive output shaft.

The larger the number of gears, the finer can a gear gradation within a large overall transmission spread be made so that, for example, an internal combustion engine of a motor vehicle can be operated in an optimum rotational speed range and therefore as economically as possible. At the same time this contributes toward increasing the driving comfort, since the combustion engine can preferably be operated at a low rotational speed level. Thus, for example, noise emissions produced by operating the combustion engine are also reduced.

Particularly suitable for this are shifting elements that can be actuated as necessary, such as electromechanical shifting elements or electromagnetic shifting elements. Compared in particular with conventional, hydraulically actuated shifting elements, these are known for particularly low and efficient energy demand since they can be operated almost free from losses. Moreover, in an advantageous way there is no need to maintain permanently a control pressure for the actuation of the for example conventional hydraulic shifting elements or to act permanently upon the shifting element concerned with the necessary hydraulic pressure when in its shifted condition. Consequently, for example further components such as a hydraulic pump are not needed provided that these serve exclusively for the control and supply of the conventional hydraulically actuated shifting elements. If the supply of other components with lubricant does not take place by way of a separate lubricant pump but by means of the same hydraulic pump, then at least this can be made smaller.

Furthermore, any leaks that may occur at oil transfer points of the hydraulic circuit, in particular from rotating components, are eliminated. Particularly preferably, this also contributes toward increasing the efficacy of the transmission in the form of higher efficiency.

When shifting elements that can be operated as necessary, of the type mentioned above, are used, it is especially advantageous for these to be easily accessible from outside. Among other things this has the advantage that it is easy to supply the shifting energy required by the shifting elements. Accordingly, it is particularly preferable to arrange the shifting elements so that they can be easily accessed from outside. In the context of shifting elements, easily accessible from outside means that no further components are associated with intermediate housings of the transmission and the shifting element, or that the shifting elements are particularly preferably arranged on the drive input shaft or on the drive output shaft.

The term "connectability" in the description and particularly in the claims is preferably understood to mean that in the case of a different geometrical position the same connection or link between interfaces is ensured, without crossing of individual connecting elements or shafts.

The term "stationary gear ratio" is understood to mean that gear ratio which is produced by the transmission ratio between the sun gear and the ring gear of the planetary gearset concerned, when the planetary carrier or web is stationary.

Further advantageous embodiments, features and advantages of the invention are described in the subordinate claims.

Expediently, except for one shifting element all the shifting elements are combined in double shifting elements, Thus most of the shifting elements, two at a time, can be actuated in common by means of one shifting element actuating device in each case, and this saves both space and costs.

Advantageously, the shifting elements are distributed at least partially symmetrically in the axial direction in the transmission and/or at least partially arranged alternately on the input shaft axis and the countershaft axis. In this way the fitting space in the axial direction can be reduced, which is advantageous for the use of the transmission in a variety of vehicles.

Expediently, a shifting element is arranged on the drive output side of that one of the two wheel planes which is positioned farthest on the drive output side, whose transmission elements are connected directly to the second countershaft. In this way the fitting space in the area of the two wheel planes can be reduced, since the two shifting elements on the input shaft axis are arranged between the two wheel planes.

Advantageously, by means of the shifting element the two countershafts can be connected. In this way a connection for the transmission of force and torques can be provided for the two countershafts by the shifting element in a simple manner.

Expediently, one of the wheel planes is designed as a reversing gear stage so as to provide at least one reversing gear. Thus, relative to one of the input shafts the rotation direction of the drive output shaft can be reversed. By virtue of the at least one reversing gear the flexibility of the transmission as regards its use in a variety of vehicles is substantially increased.

Advantageously, in the sequence of wheel planes from the drive input side to the drive output side, the reversing gear stage is arranged in the next-to-last, or the next to the next-to-last position. In this way the load on the transmission in its half on the drive input side, i.e. in the first half of the transmission between the drive input side and the range group, can be reduced.

Expediently, a single shifting element is arranged respectively with two double shifting elements on the drive input side and on the drive output side. In this way the middle part of the transmission can be made essentially compact, since only a single shifting element is then positioned there.

Advantageously, on each of the input axis and the countershaft axis there is arranged a single shifting element. In that way, for example, an odd number of shifting elements can be fitted into the transmission with the greatest possible compactness of the other shifting elements in the form of respective double shifting elements. At the same time, by virtue of the arrangement of single shifting elements they can each couple wheel planes and/or shafts in a flexible manner independently of one another.

Expediently, two single shifting elements are arranged on the input shaft axis or on the countershaft axis. This increases the flexibility of the transmission still more, since single shifting elements, in contrast to double shifting elements, can in each case be actuated separately. If the two single shifting elements are arranged on the input shaft axis or the countershaft axis, the flexibility of the transmission as regards the production of various gears and as regards its use in a variety of vehicles is increased further.

Advantageously, the two individual shifting elements are arranged between the same wheel planes. This reduces the fitting space of the transmission in the axial direction.

Expediently, the two shifting elements arranged immediately before the range group and/or the shifting elements adjacent and close to the drive input side are arranged on the input shaft axis or on the countershaft axis, in particular since these are each in the form of double shifting elements. In this way the fitting space in the area of the drive input side and/or in the area before the range group can in each case be adapted flexibly to external requirements. For example, if the two shifting elements next-closest to the drive input side are arranged on the countershaft axis, the fitting space in the area of the clutches can be reduced considerably.

Advantageously, most of the shifting elements and in particular all of them except for a single shifting element are arranged on the input shaft axis. One of the advantages achieved thereby is that the fitting space of the countershaft arrangement is reduced considerably and production is simplified.

Expediently, two shifting elements are arranged for actuating the range group and one shifting element for connecting the range group, in such manner that by means of one of the shifting elements for actuating the range group a connection can be formed to a rotationally fixed housing and by means of the other shifting element two elements of the range group can be coupled. By virtue of the two shifting elements the range group can be actuated flexibly and so provide different conditions, so that further gear steps can be provided in total by the transmission. Likewise, in a flexible manner the range group can additionally be connected into the force and torque flow by means of the one shifting element.

Advantageously, by means of the shifting element for connecting the range group an element of the range group can be connected directly to a transmission element of the final wheel plane on the input shaft axis, in particular one in the form of a drive output constant. In this way the flexibility of the connection of the range group is further increased, so that the number of possible shift conditions of the transmission is increased and the provision of further gears is considerably simplified.

Expediently seven wheel planes, including a reversing gear stage, and eleven shifting elements are provided, and by means of these at least seventeen forward gears, in particular eighteen forward gears or at least three reverse gears can be obtained. An advantage is the high flexibility and reliability of the transmission, so that it is suitable for use in a large number of different motor vehicles. Furthermore, thanks to the large number of forward gears a motor vehicle having this transmission can be operated better in the optimum range for the internal combustion engine, and this in particular reduces fuel costs.

Advantageously, at least sixteen forward gears and/or the reversing gears are sequentially fully powershiftable. Thus, a high overall powershiftability of the transmission is achieved.

Expediently, one of the gears that can be obtained by the transmission is an overdrive gear and another is a direct gear. By virtue of the overdrive gear the rotational speed of the transmission can be reduced considerably, which reduces the fuel consumption of a motor vehicle operated in this manner, A direct gear enables a particularly direct transmission of force and torques, which is advantageous for the lifetime of the transmission.

Expediently, a gearshift into the direct gear takes place by way of a support gearshift via the respective next-highest gear. This further improves the powershiftability of the transmission.

Advantageously, the range group can be powershifted. This also improves the powershifting ability of the transmission.

Advantageously, in a method as described below an eighteenth gear is obtained by closing the first clutch and the third and eleventh shifting elements. Thus, in a simple manner a further gear is made available by means of the dual clutch transmission.

Expediently, in a method as described below, a first reversing gear is obtained by closing the second clutch and the first, seventh and tenth shifting elements, a second reversing gear is obtained by closing the first clutch and the fifth, seventh and tenth shifting elements, and a third reversing gear is obtained by closing the second clutch and the second, seventh and tenth shifting elements. This has the advantage that the dual clutch transmission can provide a plurality of reversing gears.

Further important features and advantages of the invention emerge from the subordinate claims, from the drawings and from the associated figure description referring to the drawings.

It is understood that the features mentioned above and those still to be explained can be used not only in the respectively combinations indicated, but also in other combinations or as stand-alone features, without going beyond the scope of the present invention.

Preferred designs and embodiments of the invention are illustrated in the drawings and will be explained in greater detail in the description that follows, wherein the same indexes refer to the same, or similar, or functionally equivalent components or elements.

BRIEF DESCRIPTION OF THE DRAWINGS

The figures show, in schematic form:

FIG. 2: A shifting matrix for a transmission according to the first embodiment of the present invention;

FIG. 3: A shifting matrix for a transmission according to the first embodiment of the present invention.

DETAILED DESCRIPTION OF THE PREFERRED EMBODIMENTS

Figure 1:
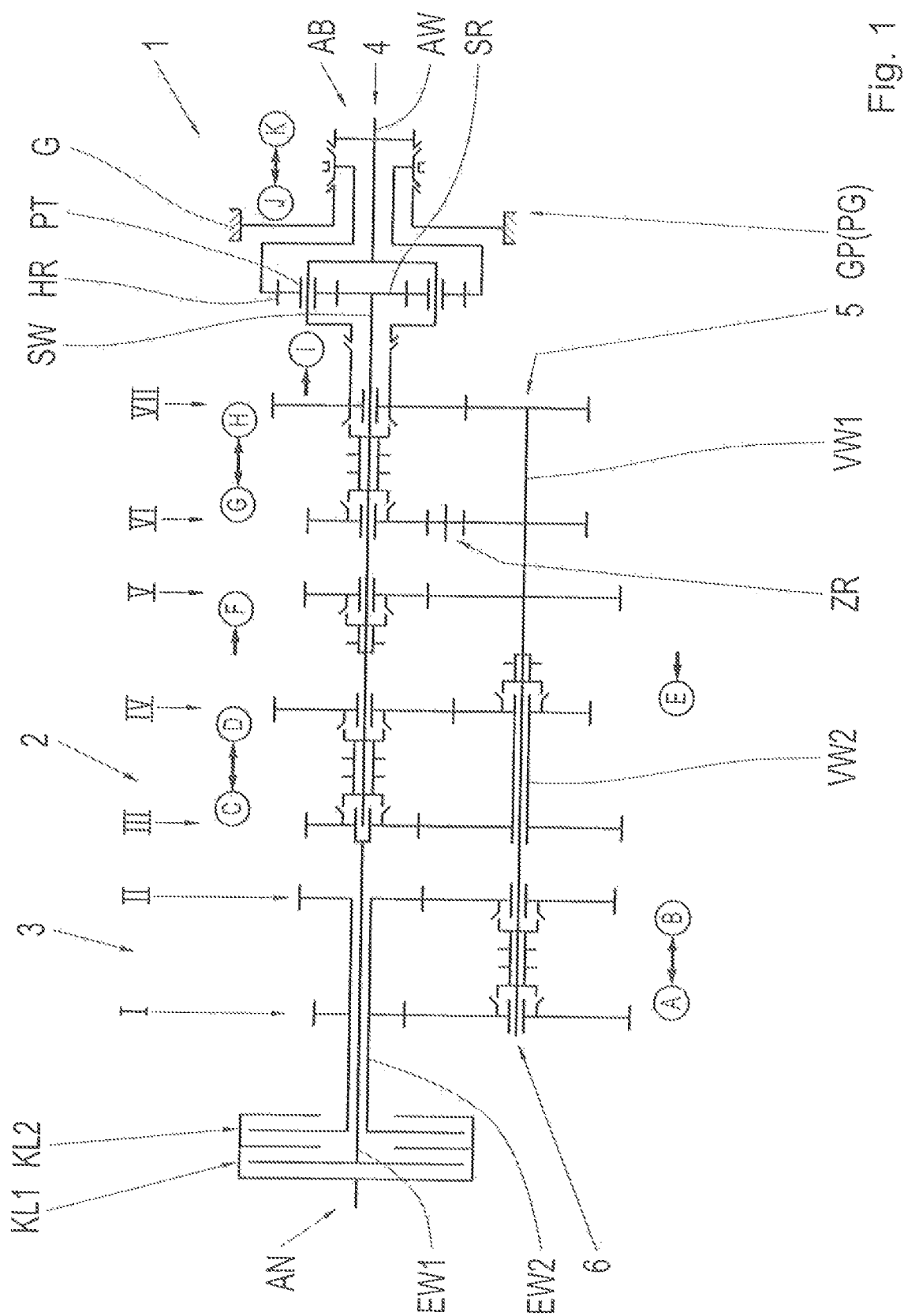
FIG. 1: A transmission according to a first embodiment of the present invention.

FIG. 1 shows a transmission according to a first embodiment of the present invention.

In FIG. 1 the index 1 refers to a dual clutch transmission. The dual clutch transmission 1 has two powershift elements in the form of clutches KL1, KL2. By means of the dual clutches KL1, KL2 the drive input side AN can be coupled or connected to the drive output side AB of the transmission for the transmission of force and torques. For this, the first clutch KL1 is connected to a first input shaft EW1 and the second clutch KL2 is connected to a second input shaft EW2. In this case the second input shaft EW2 is in the form of a hollow shaft whereas the first input shaft EW1 is a solid shaft. The two input shafts EW1, EW2 are arranged coaxially with and parallel to one another.

A drive input shaft can be connected to the two clutches KL1, KL2 and, for example, to a motor.

Furthermore, the transmission 1 has two sub-transmissions 2, 3. The first sub-transmission 2 is or can be coupled to the first input shaft EW1 and the second sub-transmission 3 to the second input shaft EW2. Associated with the first sub-transmission 2 there is at least a third wheel plane III, whereas the second sub-transmission 3 is associated with at least a first and a second wheel plane I, II.

In addition the transmission 1 comprises an input shaft axis 4 on which the two input shafts EW1, EW2 are arranged. Furthermore, on the input shaft axis 4 and downstream from the two input shafts EW1, EW2 in relation to the torque, there are arranged an intermediate shaft SW, a planetary range group GP and a drive output shaft AW.

Downstream from the drive input side AN of the transmission 1 in relation to the torque and force flow, and beginning from the two clutches KL1, KL2, the transmission 1 comprises on the input axis 4, in sequence, the first wheel plane I, the second wheel plane II, the third wheel plane III, a third shifting element C, a fourth shifting element D, a fourth wheel plane IV, a sixth shifting element F, a fifth wheel plane V, a sixth wheel plane VI, a seventh shifting element G, an eighth shifting element H, and a seventh wheel plane VII, a ninth shifting element I, the planetary range group GP, a tenth shifting element J and an eleventh shifting element K.

Each of the wheel planes I, II, III, IV, V, VI and VII comprises two transmission elements, in particular in the form of gearwheels, which in this case are each connected with a shaft and/or to one of the shifting elements A to K of the transmission 1.

Parallel to the input shaft axis 4 there is arranged a countershaft axis 5 for a countershaft arrangement 6. The countershaft arrangement 6 comprises a countershaft VW1 in the form of a solid shaft with a countershaft VW2 in the form of a hollow shaft arranged parallel to and coaxially with it. Between the input shaft axis 4 and the countershaft axis 5 the sixth wheel plane VI has an intermediate wheel ZR for reversing the rotation direction, so that by means of the drive output shaft AW but with the same rotation direction of one of the input shafts EW1, EW2 a reversed rotation direction for the provision of at least one reversing gear is enabled. Thus, the sixth wheel plane VI is designed as a reversing gear stage.

Beginning from the drive input side AN the countershaft axis 5 comprises, in sequence, the first wheel plane I, a first shifting element A, a second shifting element B, the second wheel plane II, the third wheel plane III, the fourth wheel plane IV, a fifth shifting element E, the fifth wheel plane V, the sixth wheel plane VI and the seventh wheel plane VII.

Below, the eleven shifting elements A, B, C, D, E, F, G and H, as well as I, K will now be described.

The first shifting element A is arranged on the countershaft axis 5 and is connected on one side with the first countershaft VW1 and on the other side with a transmission element of the first wheel plane I. When actuated, the first shifting element A forms a connection for the transmission of force and torque between the first wheel plane I and the first countershaft VW1.

The second shifting element B is arranged on the countershaft axis 5 and is connected on one side to the first countershaft VW1 and on the other side to a transmission element of the second wheel plane II. When actuated, the second shifting element B forms a connection for the transmission of force and torque between the first countershaft VW1 and the second wheel plane II.

The third shifting element C is arranged on the input shaft axis 4 and is connected on one side to the first input shaft EW1 and on the other side to the intermediate shaft SW and to a transmission element of the third wheel plane III. When actuated, the third shifting element C forms a connection for the transmission of force and torque between the first input shaft EW1, the third wheel plane III and the intermediate shaft SW.

The fourth shifting element D is arranged on the input shaft axis 4 and is connected on one side to the intermediate shaft SW and on the other side to a transmission element of the fourth wheel plane IV. When actuated, the fourth shifting element D forms a connection for the transmission of force and torque between the fourth wheel plane IV and the intermediate shaft SW.

The fifth shifting element E is arranged on the countershaft axis 5 and is connected on one side to the first countershaft VW1 and on the other side to the second countershaft VW2. On the second countershaft VW2 are arranged transmission elements of the third wheel plane III and the fourth wheel plane IV, which are fixed wheels. When actuated, the fifth shifting element E forms a connection for the transmission of force and torque between the first countershaft VW1 and the second countershaft VW2.

The sixth shifting element F is arranged on the input shaft axis 4 and is connected on one side to the intermediate shaft SW and on the other side to a transmission element of the fifth wheel plane V. When actuated, the sixth shifting element F produces a connection for the transmission of force and torque between the intermediate shaft SW and the fifth wheel plane V.

The seventh shifting element G is arranged on the input shaft axis 4 and is connected on one side to the intermediate shaft SW and on the other side to a transmission element of the sixth wheel plane VI. When actuated, the seventh shifting element G forms a connection for the transmission of force and torque between the sixth wheel plane VI and the intermediate shaft SW.

The eighth shifting element H is arranged on the input shaft axis 4 and is connected on one side to a transmission element of the seventh wheel plane VII and on the other side to the intermediate shaft SW. When actuated, the eighth shifting element H forms a connection for the transmission of force and torque between the seventh wheel plane VII and the intermediate shaft SW.

Furthermore a range group GP of planetary design is provided, which is connected to the intermediate shaft SW, itself forming the sun gear of the planetary gearset GP, the planetary gearset GP being designed in the usual manner. By means of the shifting element I the planetary carrier PT can be connected to the transmission element of the seventh wheel plane VII on the input axis 4. By means of the shifting element J the ring gear HR of the planetary gearset GP can be connected to the housing G in a rotationally fixed manner. By means of the shifting element K the drive output shaft AW can be coupled to the ring gear HR of the planetary gearset GP.

The first and second shifting elements A, B, the third and fourth shifting elements C, D, the fifth and sixth shifting elements E, F as well as the seventh and eighth shifting elements G, H and the tenth and eleventh shifting elements J, K are in each case combined in a shifting device and in each case can be actuated by means of a shared shifting element actuating device.

On the first input shaft EW1 the transmission element of the third wheel plane 111 is arranged in a fixed manner. On the second input shaft EW2, also fixed, are transmission elements of the first wheel plane I and the second wheel plane II, On the first countershaft VW1 are arranged in a fixed manner the transmission elements of the fifth, sixth and seventh wheel planes V, VI and VII, whereas on the second countershaft VW2 the transmission elements of the third wheel plane III and the fourth wheel plane IV are arranged in the form of fixed wheels.

FIG. 2 shows a shifting matrix for a transmission according to the first embodiment of the present invention.

In FIG. 2 a shifting matrix for a transmission 1 according to FIG. 1 is shown. Horizontally in this matrix columns are shown, respectively for shifting elements A to K and for the two clutches KL1 and KL2. Vertically downward, first the seventeen forward gears V1 to V17 are shown, and then three reversing gears indexed R1, R2 and R3. Cells left empty in the shifting matrix, for example in the case of the forward gear V1 the cells for the clutch KL1 and the shifting elements B, C, D, F, G, I, K, indicate that the corresponding shifting element or clutch is open, i.e. that the shifting element or clutch does not transmit any force or torque from the respective shaft to which the shifting element or clutch is attached or connected. A dot in a cell of the shifting matrix indicates a correspondingly actuated or closed shifting element or clutch, i.e. in the shifting matrix for forward gear V1 the clutch KL2 and the shifting elements A, H and J.

Overall, the dual clutch transmission 1 according to FIGS. 1 and 2 comprises a powershiftable range group GP of planetary design. The two sub-transmissions 2, 3 are in each case connected to their respective input shafts EW1, EW2. With the second sub-transmission 3 are associated the first and second wheel planes I and II and the shifting elements A and B, and with the first sub-transmission 2 are associated the wheel planes III and IV and the shifting elements C, D and E, with the direct gear when the shifting element C is actuated. The wheel planes V, VI and VII serve as drive output constants for forward and reverse driving, and are actuated, respectively, by means of the shifting elements F, G and H. The direct gear is the eighth forward gear V8 in the main transmission, i.e. the forward part of the transmission without the range group. The drive output constant in the form of the seventh wheel plane VII can be connected to the web/planetary carrier PT of the planetary range group GP by means of the shifting element I. The drive output constant of the first forward gear V1 is on the last wheel plane of the main transmission, in this case the seventh wheel plane VII. In the seventeenth forward gear V17, which is designed as an overdrive gear, the two sub-transmissions 2, 3 are coupled with one another. In this coupled gear V17 the drive input wheel plane III of the first sub-transmission 2 is used as the drive output wheel plane for the second sub-transmission 3. The drive output ultimately passes by way of the direct gear shifting element C. Furthermore, the transmission has three fully powershiftable reverse gears R1 to R3, both for the slow and for the fast range group setting, so that a total of six reversing gears can be obtained.

FIG. 3 shows a shifting matrix for a transmission according to the first embodiment of the present invention.

FIG. 3 shows an alternative shifting matrix for a transmission 1 according to FIG. 1. In this case, in the eighth forward gear V8 and the seventeenth forward gear V17 the two sub-transmissions 2, 3 are coupled. In the two coupled gears V8 and V17 the drive input wheel plane III of the first sub-transmission 2 is used as the drive output wheel plane for the second sub-transmission 3. Ultimately, the drive output passes by way of the shifting element C for the direct gear. The coupled gear concerned is on the same clutch as the next-lower gear V7 or V16 respectively, i.e. in this case on the second clutch KL2. Thus, if a shift is carried out from the seventh forward gear V7 to the eighth forward gear V8 or from the sixteenth forward gear V16 to the seventeenth forward gear V17, this takes place via a support gearshift by way of the ninth forward gear V9 or the eighteenth forward gear V18 with the support gears V9 or V18 respectively. In this case too there are three fully powershiftable reversing gears R1, R2 and R3 for the slow and also for the fast range group setting, so that a total of six reversing gears are available and instead of the shifting element J, the shifting element K is then actuated for the three further reversing gears, FIG. 4 shows a transmission according to a second embodiment of the present invention.

Figure 4:
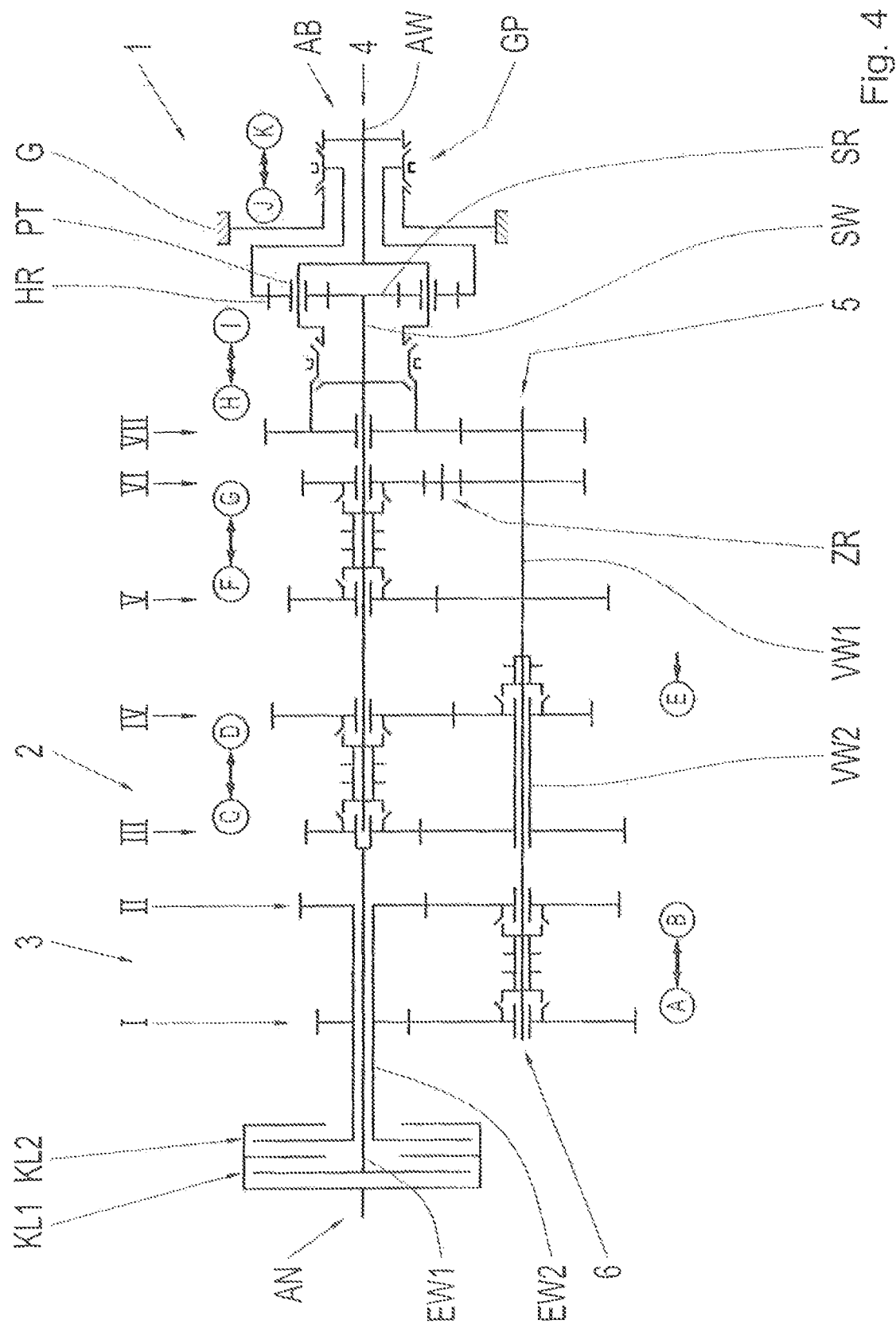
FIG. 4: A transmission according to a second embodiment of the present invention.

FIG. 4 shows a transmission 1 essentially like that of FIG. 1. The differences from the transmission 1 in FIG. 1 are now that the two shifting elements F and G and H and I are in each case combined in respective double shifting elements, which further reduces the number of shifting points in the transmission 1. In this case the shifting element H is then arranged on the drive output side of the seventh wheel plane VII together with the shifting element I, whereas the shifting element G is now arranged on the drive input side of the sixth wheel plane VI and the shifting element F is now arranged on the drive output side of the fifth wheel plane V.

In the variants shown in FIGS. 1 and 4, the wheel planes I and II can be exchanged. Moreover, the first wheel plane I and the second wheel plane II can also each be connected fixed to the countershaft and can be coupled via the respective shifting element A, B to the second input shaft EW2, which is in the form of a hollow shaft. Furthermore, the sequence of the wheel planes V and VI and their respective connection by means of double shifting elements or single shifting elements F, G, H can be varied as desired. Each of the wheel planes V, VI and VII can be connected fixed to the drive output shaft of the main transmission, i.e. the part of the transmission without the range group, and connected by means of the respective shifting element F, G, H to the countershaft VW1, which is a solid shaft.

In summary, the present invention offers the advantage that a seventeen-gear or eighteen-gear dual clutch transmission of countershaft design with a powershiftable range group is provided, which contains as few wheel planes and shifting elements as possible. A further advantage is that seventeen or sixteen fully powershiftable gears and powershiftable gears by way of a support gearshift, as well as further, non-powershiftable gears are provided.

Although the present invention has been described above with reference to preferred example embodiments, it is not limited thereto but can be modified in many ways.

INDEXES

1. Dual clutch transmission
2, 3 Sub-transmissions
4 Input shaft axis
5 Countershaft axis
6 Countershaft arrangement
AN Drive input side
AB Drive output side
EW1, EW2 Input shaft axis
VW1, VW2 Countershaft axis
AW Drive output shaft
A, B, C, D, E, F, G, H, I, K Shifting element
I, II, III, IV, V, VI, VII Wheel plane
ZR Intermediate gearwheel
KL1, KL2 Clutch
V1, V2, V3, V4, V5, V6, V7, V8, V9, V10, V11, V12, V13, V14, V15, V16, V17, V18 Forward gear
R1, R2, R3 Reversing gear
GP Planetary range group
SW Sun shaft
PT Planetary carrier/Web
HR Ring gear

The invention claimed is:

1. A dual clutch transmission for use in a motor vehicle, the dual clutch transmission comprising:
    two sub-transmissions, each of the two sub-transmissions comprising at least one input shaft and the two input shafts being arranged on an input shaft axis on a drive input side of the dual clutch transmission;
    an intermediate shaft;
    an output shaft on a drive output side of the dual clutch transmission being a drive output shaft of both the two sub-transmissions, the intermediate shaft being at least indirectly connectable with at least one of the input shafts and the drive output shaft;
    at least two wheel planes;
    at least three shifting elements;
    two clutches;
    a countershaft arrangement with a countershaft axis, the countershaft arrangement comprising at least first and second countershafts;
    the first countershaft being connectable to transmission elements of all of the at least two wheel planes on the countershaft axis, and the second countershaft being fixedly connected to transmission elements of the at least two wheel planes;
    at least a first shifting element of the at least three shifting elements being a single shifting element and a majority of the at least three shifting elements being double shifting elements, and the first and the second countershafts being connectable to each other by engagement of the first shifting element;
    second and third shifting elements of the at least three shifting elements being arranged on the input shaft axis and between the at least two wheel planes, and a range group having an input side connected to the intermediate shaft and an output side connected to the drive output shaft; and
    the at least two wheel planes comprises seven wheel planes and the at least three shifting elements comprises the first, the second and the third shifting elements and fourth, fifth, sixth, seventh, eight, ninth, tenth and eleventh shifting elements, one of the seven wheel planes is a reversing gear stage, and by the seven wheel planes and by selective engagement of the first, the second, the third, the fourth, the fifth, the sixth, the seventh, the eight, the ninth, the tenth and the eleventh shifting elements at least seventeen forward gears and at least three reversing gears are implementable.

2. The dual clutch transmission according to claim 1, wherein all of the eleven shifting elements, except for the first shifting element, are combined as double shifting elements.

3. The dual clutch transmission according to claim 1, wherein the eleven shifting elements are arranged in an axial direction in the dual clutch transmission at least partially distributed at least one of symmetrically and in alternation on the input shaft axis and the countershaft axis.

4. The dual clutch transmission according to claim 1, wherein the seven wheel planes comprising first and second wheel planes, the second wheel plane being arranged axially closer to the drive output side of the dual clutch transmission than the first wheel plane, the first shifting element is arranged on a drive output side of the second wheel plane, and transmission elements of the first and the second wheel planes are connected directly to the second countershaft.

5. The dual clutch transmission according to claim 4, wherein the first shifting element is arranged on the countershaft axis.

6. The dual clutch transmission according to claim 1, wherein the seven wheel planes are arranged axially in sequential wheel plane positions from the drive input side to the drive output side of the dual clutch transmission, and the reversing gear wheel plane is arranged either in a last or a next to last wheel plane position in the sequential wheel plane positions from the drive input side to the drive output side of the dual clutch transmission.

7. The dual clutch transmission according to claim 1, wherein the first shifting element is arranged axially between two of the double shifting elements.

8. The dual clutch transmission according to claim 1, wherein the at least three shifting elements comprise the first, the second, the third and the fourth shifting element, the fourth shifting element is a single shifting element, the fourth shifting element is arranged on the input shaft axis and the first shifting element is arranged on the countershaft axis.

9. The dual clutch transmission according to claim 1, wherein the first and the fourth shifting elements are single shifting elements, and one of the first and the fourth shifting elements is arranged on the input shaft axis and the other of the first and the fourth shifting elements is arranged on the countershaft axis.

10. The dual clutch transmission according to claim 9, wherein the first and the fourth shifting elements are arranged axially between two of the seven wheel planes.

11. The dual clutch transmission according to claim 1, wherein at least one of:
    the fourth and the fifth shifting elements are arranged immediately before the range group, and the sixth and the seventh shifting elements are arranged closest to the drive input side and are arranged on the countershaft axis.

12. The dual clutch transmission according to claim 1, wherein a majority of the eleven shifting elements are arranged on the input shaft axis.

13. The dual clutch transmission according to claim 1, wherein the fourth and the fifth shifting elements are arranged so as to actuate the range group, and a connection to a housing is formable by the fourth shifting element for actuating the range group, and a coupling of two gear elements (HR, PT) of the range group is formable by the fifth shifting element.

14. The dual clutch transmission according to claim 1, wherein the seven wheel planes comprise a terminal wheel plane, a gear element of the range group is connectable directly to a transmission element of the terminal wheel plane, which is a last wheel plane on the input shaft axis, by the fourth shifting element of the eleven shifting elements for connecting the range group.

15. The dual clutch transmission according to claim 1, wherein the at least seventeen forward gears and the at least three reversing gears are sequentially powershiftable.

16. The dual clutch transmission according to claim 1, wherein one of the at least seventeen forward gears is an overdrive gear and another one of the at least seventeen forward gears is a direct gear.

17. The dual clutch transmission according to claim 16, wherein the overdrive gear is obtainable by coupling the two sub-transmissions.

18. The dual clutch transmission according to claim 17, wherein a gearshift into the direct gear occurs via a support gearshift by way of a next gear, and the next gear being a gear that in sequence is next-higher than the direct gear.

19. The dual clutch transmission according to claim 1, wherein the range group is powershiftable.

20. A method of operating a dual clutch transmission having first and second sub-transmissions, each of the first and the second sub-transmissions comprises an input shaft and the input shafts of the first and the second sub-transmissions are arranged on a drive input side of the dual clutch transmission on an input shaft axis; an intermediate shaft; an output shaft on a drive output side of the dual clutch transmission which is the drive output shaft of both of the first and the second sub-transmissions; the intermediate shaft is connectable at least indirectly with at least one of the input shafts and the drive output shaft; seven wheel planes; first, second, third, fourth, fifth, sixth, seventh, eighth, ninth, tenth, and eleventh shifting elements; first and second clutches; a countershaft arrangement comprising first and second countershafts aligned along a countershaft axis; the first countershaft is connectable to transmission elements of all of the seven wheel planes on the countershaft axis, and the second countershaft is fixedly connected to transmission elements of at least two wheel planes of the seven wheel planes; at least one of the first, the second, the third, the fourth, the fifth, the sixth, the seventh, the eighth, the ninth, the tenth, and the eleventh shifting elements is a single shifting element and a majority of the first, the second, the third, the fourth, the fifth, the sixth, the seventh, the eighth, the ninth, the tenth, and the eleventh shifting elements are double shifting elements; and the third and the fourth shifting elements are arranged on the input shaft axis and between the at least two of the seven wheel planes having transmission elements that are connected, in a fixed manner, to the second countershaft; and a range group having a first side connected to the intermediate shaft and a second side connected to the drive output shaft, the method comprising:
obtaining a first gear by engaging the second clutch and the first, the eighth and the tenth shifting elements,
obtaining a second gear by engaging the first clutch and the fifth, the eighth and the tenth shifting elements,
obtaining a third gear by engaging the second clutch and the second, the eighth and the tenth shifting elements,
obtaining a fourth gear by engaging the first clutch and the fourth and the tenth shifting elements,
obtaining a fifth gear by engaging the second clutch and the first, the sixth and the tenth shifting elements,
obtaining a sixth gear by engaging the first clutch and the fifth, the sixth and the tenth shifting elements,
obtaining a seventh gear by engaging the second clutch and the second, the sixth and the tenth shifting elements,
obtaining an eighth gear either by engaging the first clutch and the third and the tenth shifting elements, or by engaging the second clutch and the first, the third, the fifth and the tenth shifting elements,
obtaining a ninth gear either by engaging the second clutch and the first and the ninth shifting elements, or by engaging the first clutch and the third and tenth shifting elements,
obtaining a tenth gear either by engaging the first clutch and the fifth and the ninth shifting elements, or by engaging the second clutch and the first and the ninth shifting elements,
obtaining an eleventh gear either by engaging the second clutch and the second and the ninth shifting elements, or by engaging the first clutch and the fifth and the ninth shifting elements,
obtaining a twelfth gear either by engaging the first clutch and the fourth and the eleventh shifting elements, or by engaging the second clutch and the second and the ninth shifting elements (B, I),
obtaining a thirteenth gear either by engaging the second clutch and the first, the sixth and the eleventh shifting elements, or by engaging the first clutch and the fourth and the eleventh shifting elements,
obtaining a fourteenth gear either by engaging the first clutch and the fifth, the sixth and the eleventh shifting elements, or by engaging the second clutch and the first, the sixth and the eleventh shifting elements,
obtaining a fifteenth gear either by engaging the second clutch and the second, the sixth and the eleventh shifting elements, or by engaging the first clutch and the fifth, the sixth and the eleventh shifting elements,
obtaining a sixteenth gear either by engaging the first clutch and the third and the eleventh shifting elements, or by engaging the second clutch and the second, the sixth and the eleventh shifting elements (B, F, K),
obtaining a seventeenth gear by engaging the second clutch and the second, the third, the fifth and the eleventh shifting elements or by engaging either the second clutch and the first, the third, the fifth and the eleventh shifting elements, and
whereas, in each case, all of the other clutches and shifting elements are disengaged.

21. The method according to claim 20, further comprising obtaining an eighteenth gear by engaging the first clutch and the third and the eleventh shifting elements.

22. The method according to according to claim 20, further comprising obtaining a first reversing gear by engaging the second clutch and the first, the seventh and the tenth shifting elements, obtaining a second reversing gear by engaging the first clutch (KL1) and the fifth, the seventh and the tenth shifting elements, and obtaining a third reversing gear by engaging the second clutch and the second, the seventh and the tenth shifting elements.

23. A motor vehicle in combination with a dual clutch transmission comprising:

first and second sub-transmissions, each of the first and the second sub-transmissions comprising an input shaft and the input shafts of the first and the second sub-transmissions being arranged on a drive input side of the dual clutch transmission on an input shaft axis;

an intermediate shaft;

an output shaft on a drive output side of the dual clutch transmission being the drive output shaft of both of the first and the second sub-transmissions, the intermediate shaft being at least indirectly connectable with at least one of the input shafts and the drive output shaft;

seven wheel planes;

first, second, third, fourth, fifth, sixth, seventh, eighth, ninth, tenth, and eleventh shifting elements;

first and second clutches;

a countershaft arrangement comprising first and second countershafts aligned along a countershaft axis;

the first countershaft being connectable to transmission elements of all of the seven wheel planes on the countershaft axis, and the second countershaft being fixedly connected to transmission elements of at least two wheel planes of the seven wheel planes;

at least one of the first, the second, the third, the fourth, the fifth, the sixth, the seventh, the eighth, the ninth, the tenth, and the eleventh shifting elements being a single shifting element and a majority of the first, the second, the third, the fourth, the fifth, the sixth, the seventh, the eighth, the ninth, the tenth, and the eleventh shifting elements are double shifting elements;

the third and the fourth shifting elements being arranged on the input shaft axis and between two of the seven wheel planes having transmission elements that are connected in a fixed manner to the second countershaft; and a range group having one side connected to the intermediate shaft and another side connected to the drive output shaft.

* * * * *